United States Patent [19]
Wasitis

[11] Patent Number: 5,800,891
[45] Date of Patent: Sep. 1, 1998

[54] BONDING PAD FOR NONPENETRATING ROOF MEMBRANE FASTENING SYSTEM

[75] Inventor: William A. Wasitis, Indianapolis, Ind.

[73] Assignee: Bridgestone/Firestone, Inc., Akron, Ohio

[21] Appl. No.: 787,969

[22] Filed: Jan. 23, 1997

[51] Int. Cl.⁶ .................................. B32B 3/06; B32B 3/08
[52] U.S. Cl. .................. 428/42.2; 428/40.1; 428/66.6; 428/99; 428/194; 52/410
[58] Field of Search ............................ 428/40.1, 42.2, 428/99, 194, 66.6; 52/410

[56] References Cited

U.S. PATENT DOCUMENTS

| | | | |
|---|---|---|---|
| 4,162,597 | 7/1979 | Kelly | 52/410 |
| 4,389,826 | 6/1983 | Kelly | 52/410 |
| 4,437,283 | 3/1984 | Benoit | 52/410 |
| 4,467,581 | 8/1984 | Francovitch | 52/410 |
| 4,651,490 | 3/1987 | Marston | 52/410 |
| 4,688,361 | 8/1987 | Kelly | 52/173 |
| 4,712,348 | 12/1987 | Triplett et al. | 52/408 |
| 4,747,241 | 5/1988 | Whitman | 52/173 R |
| 4,751,802 | 6/1988 | Whitman | 52/173 R |
| 4,793,116 | 12/1988 | Whitman | 52/173 R |
| 4,852,323 | 8/1989 | Kartfilt | 52/410 |
| 4,885,887 | 12/1989 | Simmons et al. | 52/410 |
| 4,977,720 | 12/1990 | Kuipers | 52/408 |
| 4,996,812 | 3/1991 | Venable | 52/408 |
| 5,177,922 | 1/1993 | Ovaert et al. | 52/410 |
| 5,204,148 | 4/1993 | Alexander et al. | 428/40 |
| 5,456,785 | 10/1995 | Venable | 156/229 |

*Primary Examiner*—Alexander Thomas
*Attorney, Agent, or Firm*—Carmen Santa Maria

[57] ABSTRACT

A bonding pad for securing a waterproof membrane to a roof deck without requiring any penetration of the membrane. The pad has a base member of EPDM with a thin bottom coating of a nonwoven polyester fabric. An EPDM tape having adhesive on both sides is secured to the top surface of the base member. A rigid attachment plate and fastener secure the base member and EPDM tape to the roof deck with the top layer of adhesive securing the membrane to the pad. Preferably the EPDM tape comprises two separated strips forming an air flow channel therebetween with the attachment plate being located with the channel. A primer coat is applied to the top layer of adhesive on the EPDM tape after an adhesive release paper is removed prior to securing the membrane to the bonding pad.

20 Claims, 3 Drawing Sheets

U.S. Patent    Sep. 1, 1998    Sheet 1 of 3    5,800,891
FIG-1
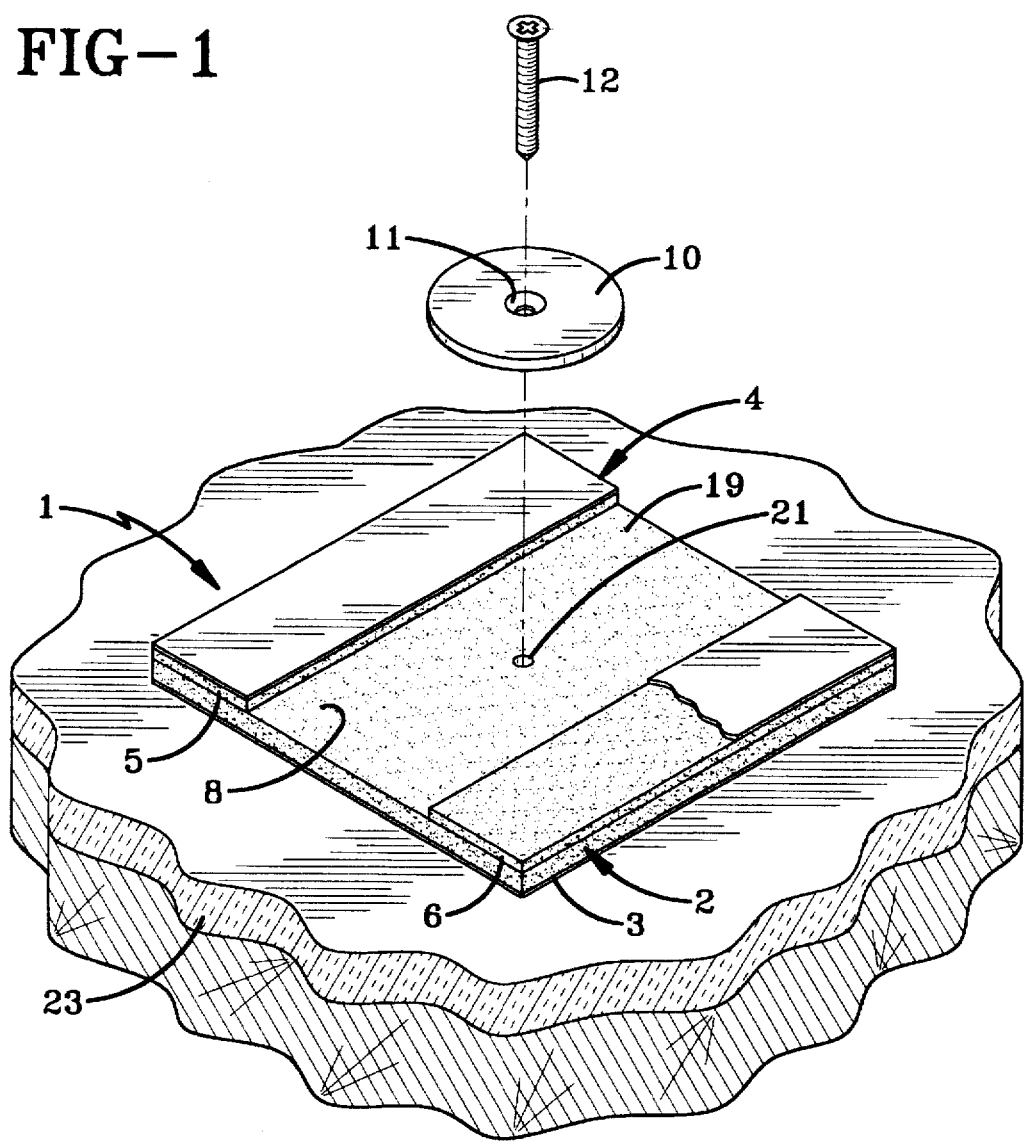
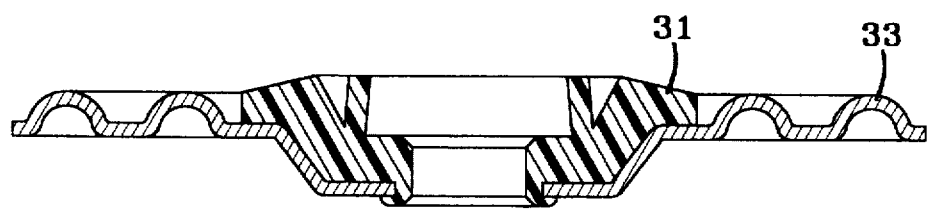
FIG-6
PRIOR ART

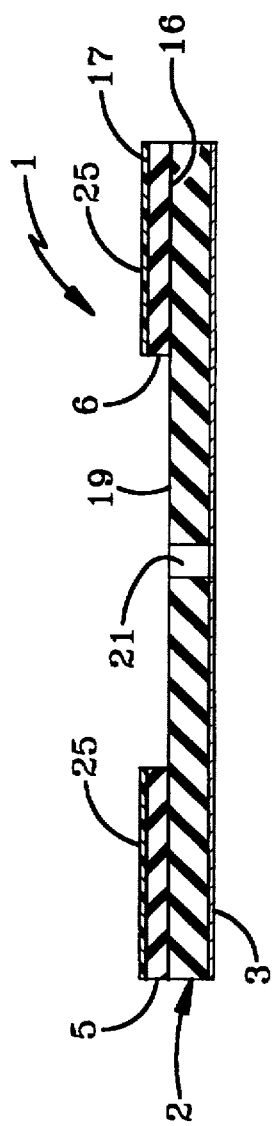
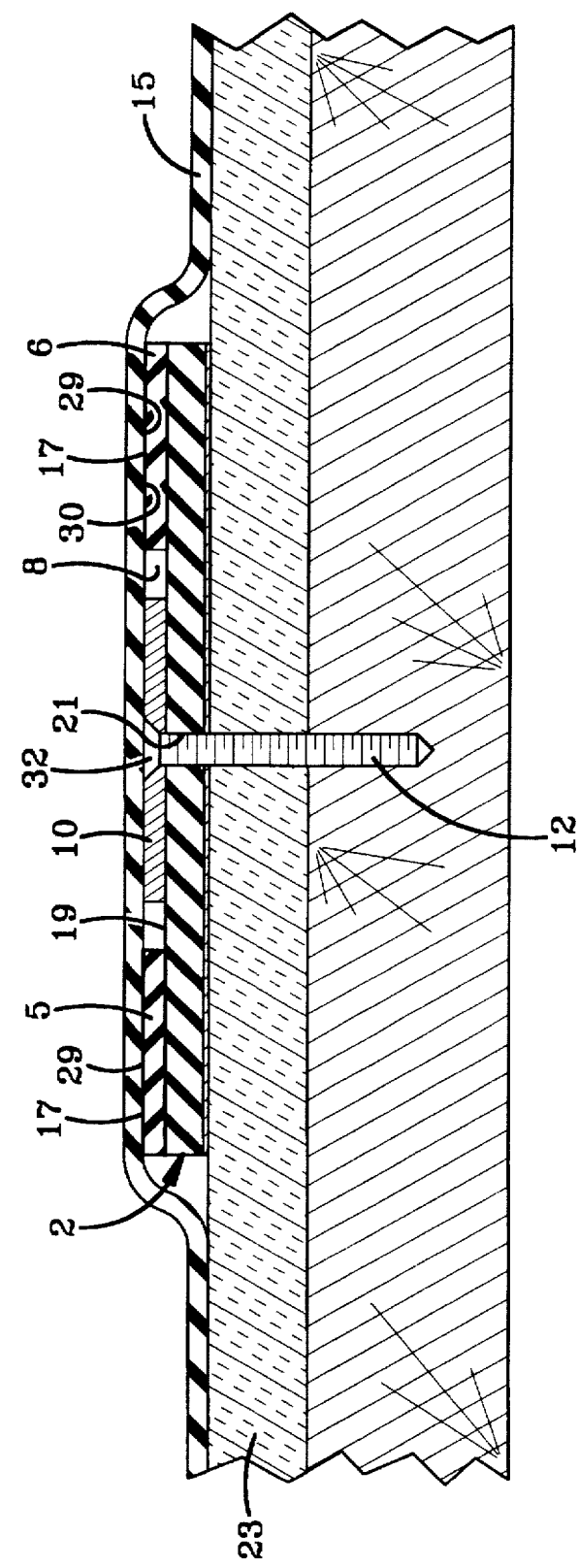

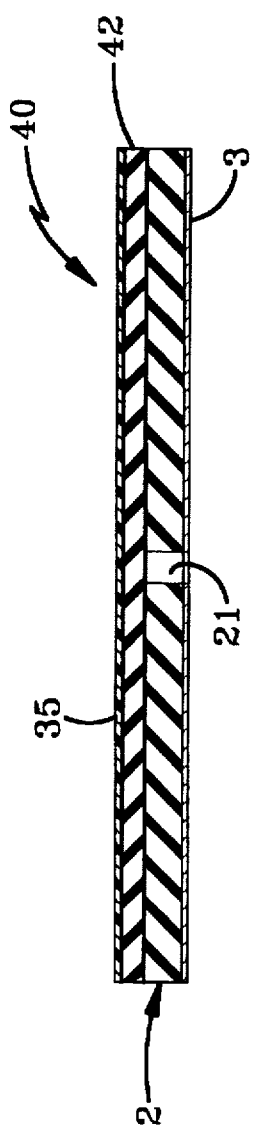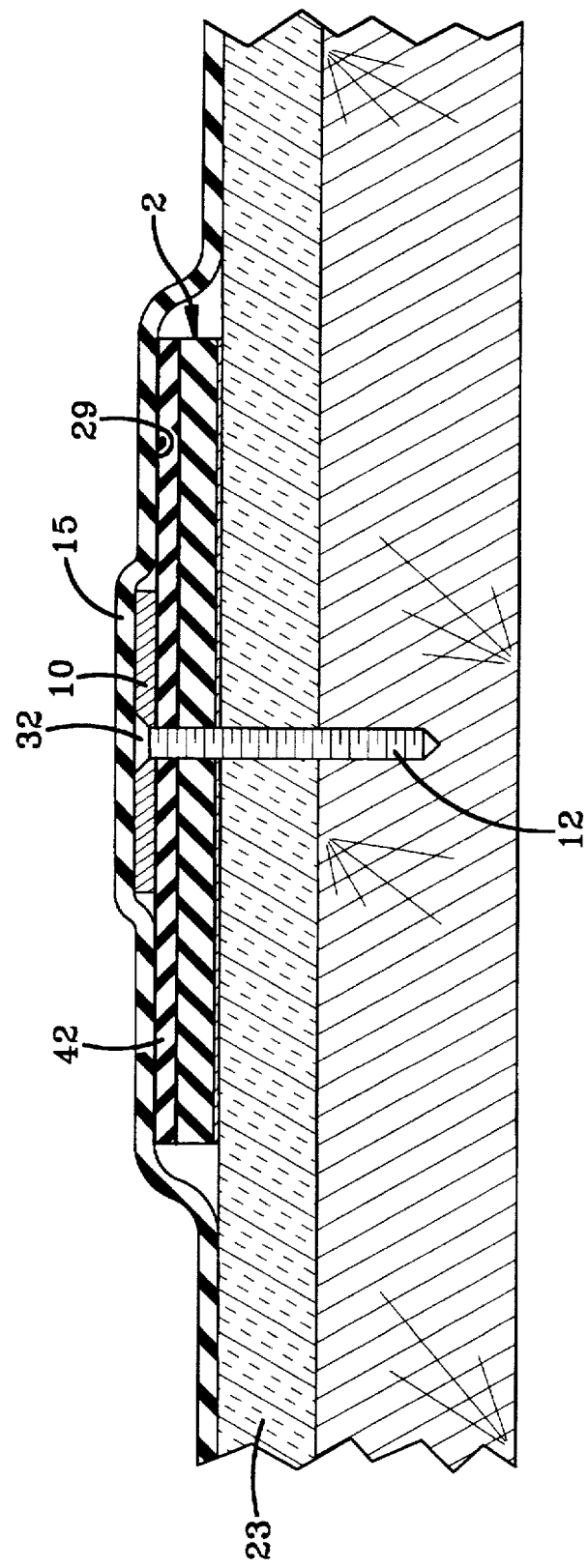

5,800,891

BONDING PAD FOR NONPENETRATING ROOF MEMBRANE FASTENING SYSTEM

BACKGROUND OF THE INVENTION

1. Technical Field

The invention relates to nonpenetrating fasting systems for securing a flexible sheet of a waterproof membrane to a roof. More particularly, the invention relates to such a fastening system in which the membrane overlies and is secured to the roof by a unique bonding pad.

2. Background Information

A large number of commercial and factory plant roofs are of a flat roof design wherein the roofing material itself is often of a built-up asphalt, and in more modern systems of a single ply of elastomeric sheet material or membrane which utilizes a mechanical ballast system or layer of stone over the membrane. While the ballast system is generally less expensive than a system using mechanical fasteners, it has a disadvantage of being quite heavy (approximately ten pounds per square foot) thus requiring a heavy roof support structure and, in addition, the roof slope cannot exceed ten percent.

Adhered roof membrane retention systems suffer from the cost penalty, while mechanical fastening systems generally require fixation of a component to the roofing substrate via mechanical fasteners. There are two basic kinds of mechanical fastening systems, namely, membrane penetrating and nonpenetrating types. Each of these types of systems has a number of favorable features and each of them is subject to various drawbacks and disadvantages.

Mechanical fastening systems of the penetrating type generally require fixation of one or more components thereof to the roofing substrate by a metal or rubberized nailing strip or plate. U.S. Pat. Nos. 4,445,306; 4,074,501; 4,455,804; 4,467,581; 4,620,402 and 4,630,422 are some examples of penetrating type fastening systems in which rigid and semirigid members are used to secure the membrane to the roof. These systems require openings to be formed in the membrane, either for receiving a fastening plate or by the attaching anchoring members. Some examples of nonpenetrating type fastening systems are shown in U.S. Pat. Nos. 3,426,412; 4,519,175; 4,619,094; 4,651,490 and 4,617,771.

Although both the penetrating and nonpenetrating mechanical-type fastening systems do work satisfactory for many applications, it is desirable for certain applications to have a nonpenetrating system to eliminate piercing the membrane. Also, such nonpenetrating fastening system can be installed in a minimum amount of time and without requiring skilled labor.

Another type of fastening system gaining in popularity is a nonpenetrating system in which the membrane is bonded to a bonding plate or pad which is secured to the roof surface beneath the membrane and is secured to the undersurface of the membrane by a bonding adhesive or fused thereto by a chemical solvent, or by sonic welding.

These plate bonded pad systems usually utilize a relatively large plate formed of a rigid material which is secured to the roof by a single attachment fastener, such as a nail or screw. The fastener may extend through a smaller washer placed on the bonding plate leaving an exposed peripheral area which is coated with an adhesive and secured to the undersurface of the overlying membrane which is formed either of a nonreinforced EPDM rubber or many other types of reinforced membrane, including PVC. In the roofing system which uses a reinforced PVC membrane, the membrane is bonded to the rigid plate by a solvent which effectively chemically welds the plasticized PVC to the rigid bonding plate.

However, it has been found that problems occur with such adhesively bonded or fused roofing systems using a rigid bonding plate in that the elastomeric membrane or sheet will subject the bonding adhesive to a "peel" action or force when the membrane is subjected to high uplift wind forces. The wind forces will attempt to peel the membrane away from the rigid bonding plate occasionally resulting in premature separation therebetween preventing the roofing system from sustaining the required wind forces and causing the system to fail.

In another known bonded roofing system the membrane of reinforced PVC is chemically bonded to a flexible bonding pad also formed of reinforced PVC. This construction effectively eliminates the peeling problem since the two PVC materials are effectively welded together with the junction being as strong as the material itself. However, the PVC membrane is considerably more expensive than the EPDM membrane resulting in an expensive roofing system.

In still another known bonded roofing system, a membrane of unreinforced EPDM is bonded by an adhesive to a bonding pad also formed of unreinforced EPDM. Although this provides a less expensive roofing system than the PVC membrane and PVC bonding pad system, problems occur since the unreinforced EPDM pads tear relatively easily about their hold-down metal washers upon experiencing uplift wind forces. In addition, these pads can have a back peel problem caused by the extensive elongation of the non-reinforced pad. All the uplift force in the area of the plate is held by the small area of the unreinforced plate around this hold-down washer. This elongation causes the adhesive bond to fail.

Although many of these prior art roof covering systems and, in particular, plate bonding systems therefor, are satisfactory for certain operations, it is desirable to have a nonpenetrating system for certain applications to eliminate piercing the membrane. Also it is desirable that the membrane is formed of a less expensive EPDM elastomeric sheet in contrast to the more expensive reinforced PVC sheet, and that the membrane can be secured by flexible bonding pads which are easily installed on the roof, to enable the attached membrane to withstand greater wind forces without separation from the bonding pads than prior art rigid bonding plates and systems, and prior art flexible bonding pads of reinforced PVC or unreinforced EPDM.

Many of these problems have been overcome by the roof membrane fastening system and bonding pad therefor, disclosed in U.S. Pat. No. 4,852,323 which is assigned to the same Assignee as is the present application, and which is modified by the present invention.

SUMMARY OF THE INVENTION

Objectives of the invention include providing an improved roof membrane fastening system and bonding pad therefor for securing a waterproofing membrane to a roof deck without any opening or puncture being imparted into the membrane thereby lessening the number of openings in the membrane during installation and subsequent possible areas of leakage.

A further objective is to provide such an improved fastening system in which a plurality of the unique bonding pads are placed in various arrangements over the roof surface to provide the required holding power for the membrane; and in which the bonding pads can be installed in a minimum amount of time and in an extremely efficient manner while reducing the possibility of the pads being installed incorrectly.

Still another objective of the invention is to provide such an improved fastening system in which the bonding pads are formed of a nonreinforced EPDM having a reinforcing coating of a polyester nonwoven fabric adhered to a bottom surface thereof, and which are attached to the roof at selected locations by a single fastener and a rigid fastening washer having a considerably smaller size diameter than that of the bonding pad; and in which an exposed outer peripheral area is provided between the washer and edge of the bonding pad containing an adhesive for subsequently bonding the overlying flexible EPDM membrane to the bonding pad.

Another objective is to provide such an improved roof fastening system in which the bonding pad has sufficient flexibility generally equal to that of the covering membrane whereby the bonding pad can curve and flex upwardly with the upward movement or billowing action of the secured membrane; in which the bonding pad is formed of a nonreinforced flexible EPDM material having a sheet of nonwoven polyester fabric secured thereto providing reinforcement sufficient to resist tearing away from the overlying rigid attachment washer and which has a relatively low elongation factor in comparison to that of the unreinforced EPDM membrane, thereby placing the connecting adhesive between the membrane and bonding pad in shear in contrast to the peel forces which are exerted on the adhesive when bonding the flexible membrane to a rigid base plate; and in which this reinforced flexible, low elongation bonding pad enables the secured membrane which is formed of the relatively inexpensive nonreinforced EPDM material to withstand higher uplift wind forces since the adhesive is able to withstand larger forces in shear loading than in the peel loading as occurs with a rigid bonding plate.

A still further objective of the invention is to provide such an improved roof fastening system in which the attachment washer is formed with a recessed central area for receiving a plastic locking member to provide a cushioning seal about the head of the linear fastener and eliminate the need for putting a sealer on the fastener head which extends though the central opening of the fastening washer to prevent possible damage to the covering membrane and to prevent possible backout of the fastener from its installed position.

A further objective of the invention is to provide such an improved fastening system in which the bonding pads are formed of nonreinforced EPDM, reinforced with a bottom layer of a fabric such as polyester, and when used in conjunction with a nonreinforced EPDM roofing membrane provides a roof system which is less expensive than the reinforced PVC membrane systems.

Another objective of the invention is to provide such an improved fastening system in which the bonding pad is attached to the overlying roof membrane by the upper adhesive surface of a pressure sensitive adhesive tape; in which the bonding pad may have various configurations such as circular or rectangular and is considerably greater in overall area than the area of the rigid fastening washer; and in which the bonding pad in conjunction with the attachment washer and fastener provide an extremely inexpensive and effective fastening system for achieving the objections of the invention in a simple, economical and efficient manner.

Still another objective of the invention is to provide such an improved fastening system which has a lower profile on the roof than many other types of mechanical fastening systems, which is less susceptible to damage from the top of the membrane such as that caused by individuals walking on the roof or objects being dropped on the membrane fastener and bonding pad; and in which the rubber-to-rubber adhesive bond between the EPDM membrane and bonding pad is a proven method of attachment.

A further objective of the invention is to provide such a fastening system in which air channels are formed beneath the membrane around the holddown washer to prevent air from being trapped over and around the washer.

These objectives and advantages are obtained by the improved bonding pad for securing a waterproof membrane to the upper surface of the roof, the general nature of which may be stated as including a pad having a base member of nonreinforced EPDM with top and bottom surfaces and a coating of a polyester nonwoven fabric on the bottom surface of the base member; a layer of EPDM tape having an adhesive coating on upper and lower surfaces, the lower surface of the tape being adhered to the top surface of the base member; an adhesive release sheet covering the adhesive coating on the upper surface of the EPDM tape; a rigid attachment plate having an upper surface and a lower surface located above the upper surface of the base member; and a fastener extending through at least the base member and attachment plate for securing the pad and attachment plate to the roof.

These objectives and advantages are further obtained by the improved nonpenetrating roof membrane fastening system of the present invention the general nature of which may be stated as including a plurality of flexible bonding pads arranged in a spaced relationship on the deck, each of said pads having a base member of a nonreinforced EPDM with top and bottom surfaces with a layer of a polyester nonwoven fabric secured to said bottom surface; a layer of EPDM tape having an adhesive coating on upper and lower surfaces thereof, the lower surface of the tape being adhered to the top surface of the base member; a rigid fastener plate mounted on the upper surface of each of the bonding pads; a fastener extending through each of the bonding pads and fastener plates for securing the pads and plates to the deck; a flexible waterproof membrane formed of nonreinforced EPDM supported by the deck and covering the secured bonding pads and fastener plates and secured to the bonding pads by the adhesion on the upper surface of said pads.

BRIEF DESCRIPTION OF THE DRAWINGS

Preferred embodiments of the invention, illustrative of the best modes in which applicant has contemplated applying the principles, are set forth in the following description and are shown in the drawings and are particularly and distinctly pointed out and set forth in the appended claims.

FIG. 1 is a exploded perspective view showing one embodiment of the non-penetrating roof fastening system of the present invention mounted on a section of a roof;

FIG. 2 is an enlarged sectional view of the EPDM base member and tape components of the fastening system shown in FIG. 1;

FIG. 3 is an enlarged fragmentary sectional view of the assembled fastening system of the present invention secured to a roof;

FIG. 4 is a sectional view similar to FIG. 2 of a modified EPDM base member and tape components;

FIG. 5 is a sectional view similar to FIG. 3 showing the base member and tape components of FIG. 4 secured to a roof; and FIG. 6 is a cross-sectional view of a type of prior art attachment plate for use in the roof fastening system of the present invention.

Similar numerals refer to similar parts throughout the drawings.

DESCRIPTION OF THE PREFERRED EMBODIMENT

A first embodiment of the improved bonding pad of the present invention is indicated generally at 1, and is shown particularly in FIGS. 1–3. Pad 1 includes as its principle components a base member 2 formed of a nonreinforced EPDM material, and in accordance with one of the features of the invention, it has a separate reinforcing layer, preferably of a continuous polyester needle punched engineering fabric 3, secured thereto. Fabric layer 3 may be secured to the bottom surface of base member 2 by a variety of means such as being applied thereto in sheets and subsequently bonded thereto during the curing of the EPDM base member or secured by various adhesives or other securement means.

Bonding pad 1 further includes a layer of EPDM tape 4 consisting of two individual strips 5 and 6 which extend throughout the length of base member 2 and are spaced apart to form a channel 8 therebetween. A rigid attachment washer or plate 10 formed with a central opening 11 for receiving a fastener 12, is located within channel 8 on the top surface of base member 2. In accordance with another feature of the invention, channel 8 has a width equal to and preferably greater than the width or diameter of washer 10 as shown particularly in FIG. 3 which provides for clearance around the washer and the adjacent tape strips to prevent air from being trapped around the washer beneath a covering membrane 15 when it is secured thereto, as shown in FIG. 3.

Base member 2 and reinforcing fabric 3 are shown as having a rectangular configuration but may be rounded or have other shapes without effecting the concept of the invention.

Tape strips 5 and 6 are double sided adhesive strips, having adhesive layers 16 and 17 on the bottom and top surfaces, respectively, with the bottom adhesive layer 16 (FIG. 2) usually being secured to top surface 19 of base member 2. Base member 2 may be formed with a central hole 21 for receiving fastener 12 therethrough for securing pad 1 on the top surface of a roof deck 23 (FIG. 3). Preferably top adhesive layers 17 of tape strips 5 and 6 are covered with adhesive release strips 25, such as silicone treated paper, to protect adhesive layers 17 until the pads have been secured to the roof deck by fasteners 12 and just prior to the placement of top covering roof membrane 15 thereon.

Another advantage achieved by improved bonding pad 1 having the two spaced strips of adhesive secured thereto, in addition to providing the airflow channel therebetween, allows for the easy peeling away of release paper strips 25 after the plate has been installed eliminating any of the release paper remaining under attachment plate 10 heretofore resulting in uneven tearing of the release paper and the increased difficulty thereof. Furthermore, release strips 25 protect the adhesive 17 from contamination until just prior to the placement and bonding of membrane 15 thereon. A primer 29 is applied to the bottom surface 30 of roof membrane 15 at each bonding pad 1 prior to mating it with adhesive layers 17 of tape strips 5 and 6 to increase the bonding of membrane 15 to adhesive strips 5 and 6.

Fasteners 12 preferably are threaded to provide for a secure attachment to roof deck 23. Also a plastic locking insert 31 can be mounted between fastener head 32 and incorporated into another type of hold-down washer 33 (FIG. 6) which will eliminate the need for putting a sealant over the fastener head heretofore desired to prevent the fastener from backing out of its attachment to roof deck 23 and preventing damage to membrane 15 when it is walked upon or experience other external forces thereon.

As indicated previously, pad 1 is a modification of the bonding pad and roof fastening system of U.S. Pat. No. 4,852,323, the contents of which are incorporated herein by reference, with the main advantage being the formation of the pad from a nonreinforced EPDM base member 2 having the separate sheet or ply a reinforcing fabric 3 secured thereto, in addition to the formation of air channel 8 adjacent the washer.

As indicated in the earlier roof fastening system of U.S. Pat. No. 4,852,323, one type of EPDM material found suitable for membrane 15 has a specific gravity of 1.115±0.05 with a minimum tensile strength of 1305 PSI, a tear resistance of 150 lbs./in., and a Shore A duromater of 65±10, with nonreinforcing membrane 15 having a minimum elongation of 300% and pad 1 having and an elongation factor of at most 1/10 of that of membrane 15.

In the preferred embodiments shown in FIGS. 1–3, bonding pad 1 has a rectangular square configuration with the preferred size being 10 inches. Attachment washers or plates 10 and 33 are considerably smaller than pad 1 and in the preferred embodiment has a diameter of approximately 2 inches, with channel 8 having a width of between four and six inches. This relationship enables the bonding pad to flex outwardly about the washers when membrane 15 experiences high uplift wind forces and provides a sufficiently large exposed area for bonding the membrane thereto. The reinforcing of nonreinforced base member 2 with woven fabric 3 provides a similar effect as that of the bonding pad of U.S. Pat. No. 4,852,323 but enables pad 1 to be formed of the two separate components, namely, a nonreinforced EPDM base member 2 to which is applied reinforcing fabric 3, instead of the base member being as an internally reinforced and specially constructed material as previously required, yet which provides the same desired effects, that is, eliminates nearly all peel forces exerted on the adhesive and subjects the adhesive to a shear force, and as is well known in the art, adhesives are able to withstand considerably larger shear forces before separation of the parts joined thereby, then if subjected to peel forces.

In the preferred embodiment base member 2 preferably has a thickness of approximately 0.060 inches and EPDM tape 4 has a thickness of approximately 0.035 inches with washer 10 having a thickness of approximately 0.03 inches.

A modified form of the invention, and in particular a modified bonding pad 40 is shown in FIGS. 4 and 5 and includes the same base member 2 and attached fabric layer 3. The main difference is that adhesive tape 42 is a single piece of material which covers and is secured to the entire top surface of base member 2, and is covered by a single sheet of release paper 35, which is removed prior to applying primer 29 thereto, followed by the subsequent adhesion or bonding of membrane 15 as shown in FIG. 5.

In summary, the improved bonding pad and fastening system of the present invention achieves the same features and advantages of the bonding pad and fastening system of U.S. Pat. No. 4,852,323 but by the use of a unique bonding pad formed of a nonreinforced EPDM base member which has a sheet or layer of a nonwoven polyester fabric, in combination with one or more strips of a double sided EPDM adhesive tape. The tape is secured to the upper surface of the nonreinforced EPDM base member and in one embodiment an air channel is formed around the hold down washer to prevent air from being trapped therein. Also by the formation of the EPDM adhesive tape of two spaced strips it enables the washer and fastener to be secured to the bonding pad and roof deck prior to removing the adhesive release paper from the tape without any of the release paper being located between the washer and bonding pad. Furthermore, a plastic sealing member eliminates the need of applying additional sealant to the head of the fastener to prevent its backing out of its attachment with the roof deck, and which reduces damage to the covering roof membrane.

Accordingly, the improved bonding pad for nonpenetrating roof membrane fastening systems is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purpose and are intended to be broadly construed.

Moreover, the description and illustration of the invention is by way of example, and the scope of the invention is not limited to the exact details shown or described.

Having now described the features, discoveries and principles of the invention, the manner in which the improved bonding pad and nonpenetrating roof membrane fastening system is constructed and used, the characteristics of the construction, and the advantageous, new and useful results obtained, the new and useful structures, devices, elements, arrangements, parts and combinations, are set forth in the appended claims.

I claim:

1. A bonding pad for securing a waterproof membrane to the upper surface of a roof, said pad comprising:
    a base member of nonreinforced EPDM having top and bottom surfaces and a coating of a polyester nonwoven fabric secured to the bottom surface of said base member;
    a layer of EPDM tape having an adhesive coating on upper and lower surfaces of said tape, the lower surface of said tape being adhered to the top surface of the base member;
    an adhesive release sheet covering the adhesive coating on the upper surface of the EPDM tape;
    a rigid attachment plate having an upper surface and a lower surface located above the upper surface of the base member; and
    a fastener extending through at least the base member and attachment plate for securing the pad and attachment plate to the roof.

2. The pad defined in claim 1 in which the layer of EPDM tape is a continuous member extending over substantially the entire top surface of the base member.

3. The pad defined in claim 2 in which the release sheet is a continuous member extending over substantially the entire upper surface of the EPDM tape.

4. The pad defined in claim 3 in which the attachment plate is engaged with the upper surface of the EPDM tape.

5. The pad defined in claim 4 in which the fastener extends through an opening formed in the attachment plate and through the base member when securing the pad to the roof.

6. The pad defined in claim 1 in which the layer of EPDM tape includes two separate strips spaced apart on the base member and forming a channel therebetween; and in which the release sheet includes two separate strips, each covering a respective one of the tape strips.

7. The pad defined in claim 6 in which the attachment plate is located within the channel between the EPDM tape strips and is engaged with the top surface of the base member.

8. The pad defined in claim 7 in which the EPDM tape strips form a substantially straight and continuous channel therebetween; and in which the channel has a width greater then the width of the attachment plate.

9. The pad defined in claim 1 including a primer on the top surface of the EPDM tape.

10. The pad defined in claim 1 in which the base member has a thickness of about 0.060 inches and the EPDM tape has a thickness of about 0.035 inches.

11. The pad defined in claim 10 in which the attachment plate has a thickness of about 0.036 inches.

12. The pad defined in claim 1 in which the attachment plate is disc-shaped and is formed with a central hole for receiving the fastener therethrough.

13. The pad defined in claim 12 in which the attachment plate is metallic and has a diameter of at least 2 inches.

14. The pad defined in claim 13 in which a plastic insert is mounted between a head of the fastener and the attachment plate to prevent the faster from backing out of its attachment to the roof.

15. The pad defined in claim 1 in which the base member is rectangular.

16. In a roofing structure having a deck for supporting the roofing structure, said structure including:
    a plurality of flexible bonding pads arranged in a spaced relationship on the deck, said pads having a base member of a nonreinforced EPDM having top and bottom surfaces with a layer of a polyester nonwoven fabric secured to said bottom surface;
    a layer of EPDM tape having an adhesive coating on upper and lower surfaces thereof, said lower surface of the tape being adhered to the top surface of the base member;
    a rigid fastener plate mounted on the upper surface of each of the bonding pads;
    a fastener extending through each of the bonding pads and fastener plates for securing said pads and plates to the deck;
    a flexible waterproof membrane formed of nonreinforced EPDM supported by the deck and covering the secured bonding pads and fastener plates and secured to said bonding pads by the adhesion on the upper surface of said pads.

17. The roofing structure defined in claim 16 in which the layer of EPDM tape includes two separate strips spaced apart on the base member and forming a channel therebetween.

18. The roofing structure defined in claim 17 in which the fastener plate is located within the channel between the EPDM tape strips and is engaged with the top surface of the base member.

19. The roofing structure defined in claim 18 in which the EPDM tape strips form a substantially straight and continuous channel therebetween; and in which the channel has a width greater then the width of the attachment plate.

20. The roofing structure defined in claim 16 including a primer on the top surface of the EPDM tape.

* * * * *